United States Patent
Lunz et al.

(10) Patent No.: US 6,822,349 B2
(45) Date of Patent: Nov. 23, 2004

(54) LINEAR MOTOR

(75) Inventors: Erich Lunz, Lonnerstadt (DE); Frank Dürschmied, Nürnberg (DE)

(73) Assignee: Ina Wälzlager Schaeffler oHG, Herzogenaurach (DE)

( * ) Notice: Subject to any disclaimer, the term of this patent is extended or adjusted under 35 U.S.C. 154(b) by 0 days.

(21) Appl. No.: 10/415,133

(22) PCT Filed: Oct. 5, 2001

(86) PCT No.: PCT/EP01/11521

§ 371 (c)(1),
(2), (4) Date: Apr. 25, 2003

(87) PCT Pub. No.: WO02/35690

PCT Pub. Date: May 2, 2002

(65) Prior Publication Data

US 2004/0041474 A1 Mar. 4, 2004

(30) Foreign Application Priority Data

Oct. 27, 2000 (DE) .......................... 100 53 321

(51) Int. Cl.[7] .............................................. H02K 41/00
(52) U.S. Cl. ........................................ 310/12; 310/14
(58) Field of Search .............................. 310/12, 13, 14, 310/27, 80

(56) References Cited

U.S. PATENT DOCUMENTS 4,439,702 A * 3/1984 Belikov et al. ............... 310/80
4,712,027 A * 12/1987 Karidis ........................ 310/12

FOREIGN PATENT DOCUMENTS

| DE | 26 23 234 | 12/1977 |
| DE | 195 47 686 | 6/1997 |
| DE | 197 24 283 | 12/1998 |
| JP | 61231867 | 10/1986 |
| JP | 63031462 | 2/1988 |
| JP | 08163857 | 6/1996 |
| JP | 10257751 | 9/1998 |

* cited by examiner

Primary Examiner—Thanh Lam
(74) Attorney, Agent, or Firm—Henry M. Feiereisen

(57) ABSTRACT

A linear motor includes a secondary part (1) having several permanent magnets (4) disposed behind one another with alternating orientation of the polarity, or excitation windings. These permanent magnets (4) or excitation windings are wound helically around a rotation axis. Furthermore, there is provided a primary part (2) having a current-carrying winding disposed in parallel relationship to the permanent magnets (4) or excitation windings and arranged about the rotation axis such that a magnetic traveling field travels helically about the rotation axis.

21 Claims, 3 Drawing Sheets

LINEAR MOTOR

FIELD OF THE INVENTION

Figure 1:
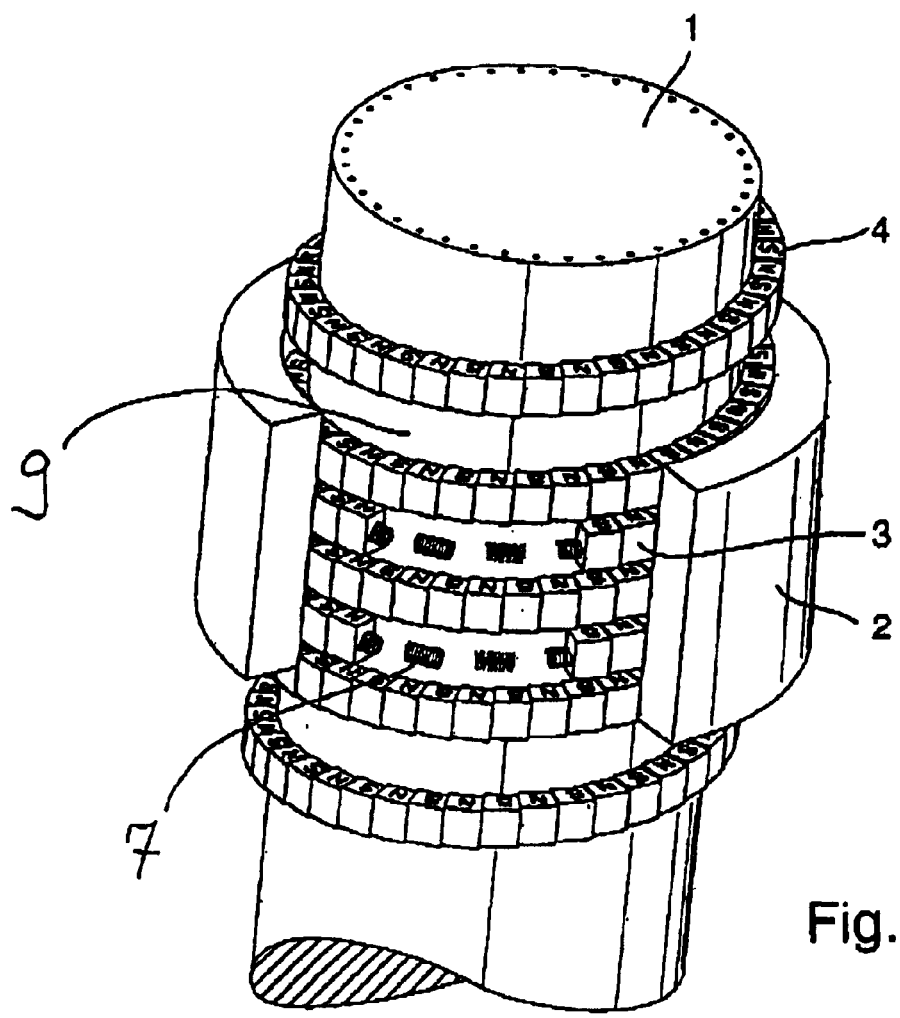

The present invention relates to linear motors, which may be configured as an electric synchronous motor or asynchronous motor. Such linear motors find increasingly application in the machine tool construction.

BACKGROUND OF THE INVENTION

DE 195 47 686 A1 discloses, for example, an electric synchronous linear motor. A secondary part is comprised of several identical secondary individual parts and mounted in a machine bed between two guide rails. Mounted on the latter for guidance is a bridge-like machine carriage having an underside in confronting disposition to the secondary part of the linear motor for support of the primary part. The primary part includes a block for accommodation of electric coils and lines. All existing secondary individual parts have identical configuration as far as the magnetic pole arrangement is concerned and have each four permanent magnets. As viewed in lengthwise direction of the secondary part, a north pole is followed continuously by a south pole, and vice versa. The step width of the pole grid is equal to half the length of a secondary individual part.

Such linear motor may have travel speeds of up to 100 m/min. However, the forces transmittable in travel direction are limited.

OBJECT OF THE INVENTION

It is thus an object of the present invention to provide a linear motor to obviate this drawback.

SUMMARY OF THE INVENTION

This object is attained in accordance with the invention by a linear motor which includes a secondary part having several permanent magnets, disposed behind one another with alternating orientation of the polarity, or excitation windings, whereby the permanent magnets or excitation windings are wound helically around a rotation axis, and a primary part having a current-carrying winding disposed in parallel relationship to the permanent magnets or excitation windings and arranged about the rotation axis such that a magnetic traveling field travels helically about the rotation axis.

The force of the traveling field acts along the helical line, and can be split in components which act in axial direction and in circumferential direction. The component acting in axial direction effects a contactless support of the primary part in axial direction by the secondary part. The component acting in circumferential direction effects the establishment of a relative rotation between the secondary part and the primary part about the rotation axis. The speed by which the primary parts and secondary parts move in axial direction relative to one another can, for example, be influenced via the pitch of the wound permanent magnets or excitation windings, i.e. their disposition about the rotation axis.

Further, the pitch can be used to influence the torque effective in circumferential direction between primary part and secondary part. A slight pitch means a higher torque and thus significantly greater forces that can be transmitted in axial direction.

The present invention combines the advantageous characteristics of known linear motors with the advantageous characteristics of ball screw mechanisms known per se.

In most applications, the primary part is the moving part and is designated as rotor. In this case, the secondary part is stationary and designated as stator. As an alternative, the primary part may be stator and the secondary part may be rotor.

According to a further development of the invention, a stator may include a threaded spindle, and the rotor may include a spindle nut, or the rotor may include a threaded spindle and the stator a spindle nut.

Preferably, the winding of the primary part is formed of a plurality of partial windings arranged in series. The pitch of the permanent magnets or the excitation windings of the secondary part is preferably equal to a pitch of the partial windings of the primary part.

The permanent magnets may be provided along several windings about a rotation axis, with permanent magnets of same polarity arranged flush behind one another in parallel relationship to the rotation axis.

The spindle nut is preferably rotatably supported by the threaded spindle via a radial bearing, especially rolling-contact bearing or sliding bearing. This way ensures an accurate positioning of the spindle nut on the threaded spindle.

BRIEF DESCRIPTION OF THE INVENTION

An exemplified embodiment of the invention will now be described in more detail with reference to two Figures.

Figure 2:
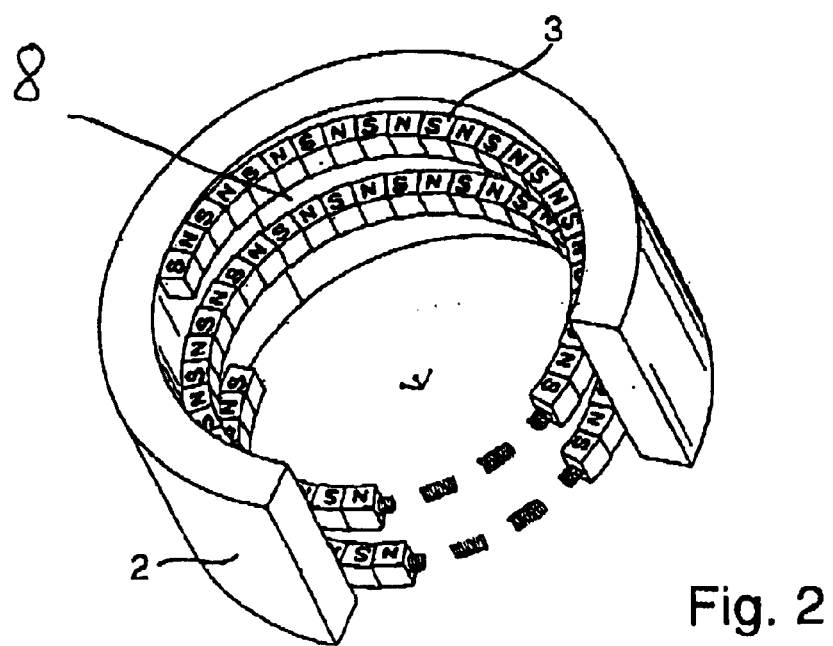
Figure 3:
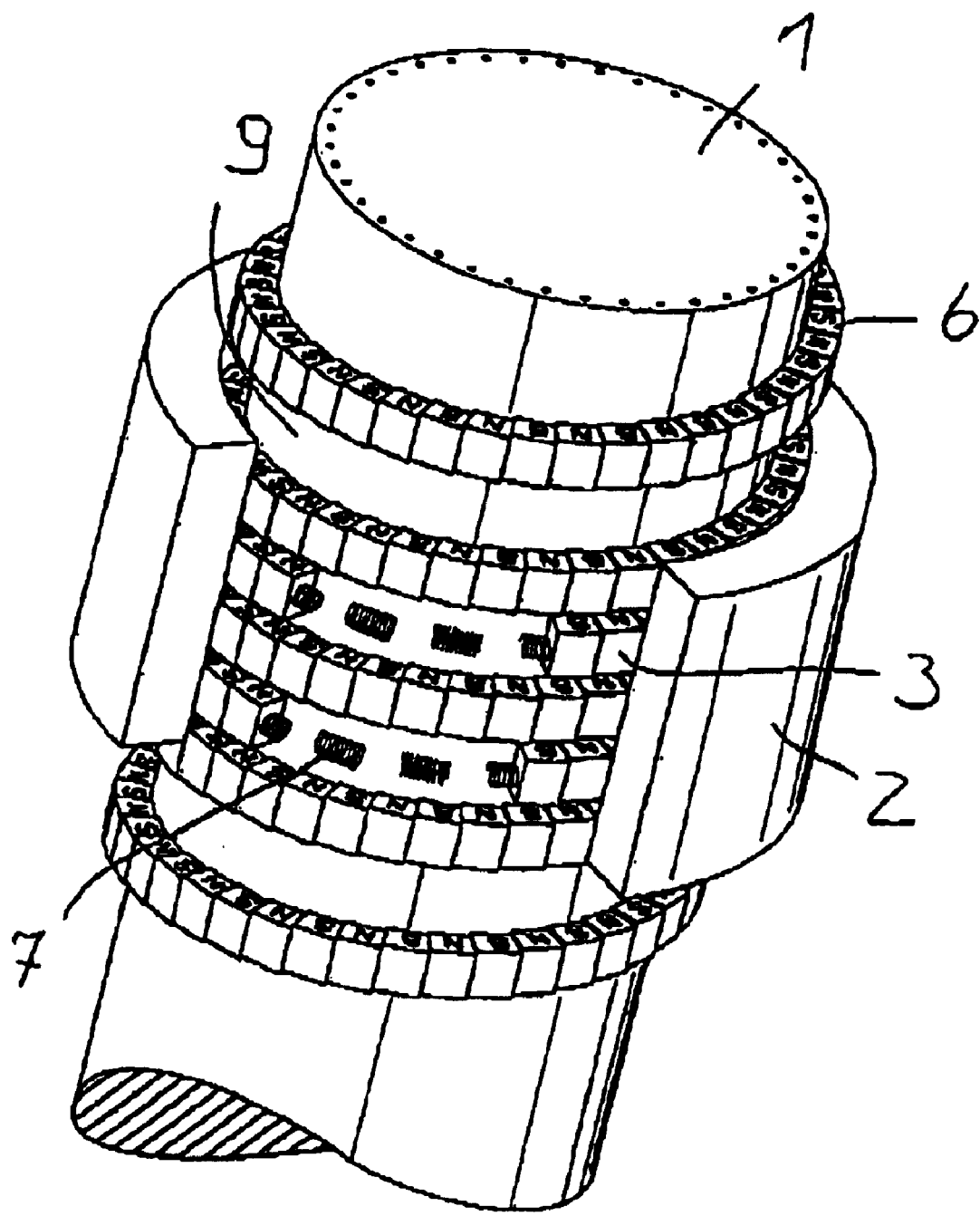
Figure 4:
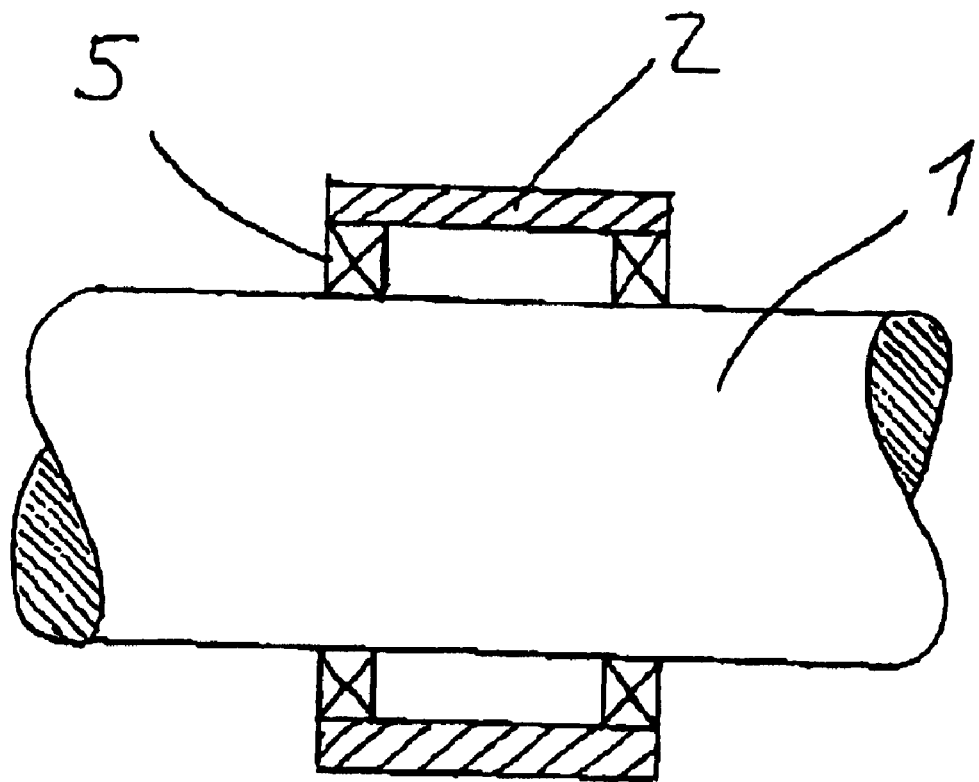

It is shown in:

FIG. 1 a schematic illustration of a linear motor according to the invention;

FIG. 2 the spindle nut of the inventive linear motor of FIG. 1;

FIG. 3 a schematic illustration of another embodiment of a linear motor according to the invention; and FIG. 4 a detailed sectional view of the spindle nut in combination with the threaded spindle.

DETAILED DESCRIPTION OF PREFERRED EMBODIMENTS

The linear motor according to the invention includes a threaded spindle and a spindle nut which is rotatably disposed on the threaded spindle. The threaded spindle 1 and the spindle nut 2 have a same pitch.

The spindle nut 2, clearly depicted in FIG. 2, has an inner circumference, with a plurality of coils 3 arranged behind one another about the inner circumference, whereby poles of same polarity of immediately neighboring coils 3 face away from one another. In the present example, the successive coils 3 define a thread turn 8.

The threaded spindle 1 has an outer circumference, with a plurality of permanent magnets 4 arranged behind one another about the outer circumference and defining a thread turn 9 (FIG. 1) on the threaded spindle 1. Poles of same polarity of immediately neighboring permanent magnets 4 face away from one another. The coils 3 of the spindle nut 2 engage between turns of permanent magnets 4 of the threaded spindle 1. As an alternative to the provision of permanent magnets, it is also possible to arrange excitation windings 6, as shown in FIG. 3.

As shown in FIG. 4, it is advantageous to provide between the spindle nut 2 and the threaded spindle 1 a radial bearing 5, especially a rolling-contact bearing or sliding bearing, to reliably support the spindle nut 2 upon the threaded spindle 1 in radial directions. This ensures a reliable centering to enable a reliable operation of the linear motor.

The mode of operation of the linear motor according to the invention will now be described in more detail. For this purpose, it is assumed that the spindle nut 2 is a stationary primary part, i.e. a stator, and the threaded spindle 1 forms a rotating secondary part, i.e. rotor. The spindle nut 2 as primary part 2 with the current-carrying coils 3 are disposed in parallel relationship to the permanent magnets 4 or excitation windings 6 and arranged about the rotation axis such that a magnetic traveling field travels helically about the rotation axis. Each of the coils 3 of the spindle nut 2 represents a partial winding, as indicated in FIGS. 1 and 3 by reference numeral 7, whereby all partial windings 7 define the winding of the primary part 2. The pitch of the permanent magnets 4 or the excitation coils 6 of the secondary cart (2) is equal to a pitch of the partial windings (3) of the primary part.

The current-carrying coils 3 generate a traveling field which acts along the given pitch about the rotation axis. The force of the traveling field can be split in components, effective in axial and circumferential directions. The axial component effects a contactless support of the primary part in axial direction upon the secondary part. The component acting in circumferential direction effects a rotation of the primary part in relation to the secondary part about the rotation axis. The torque between the primary part and the secondary part is directly determined at given magnetic field strength via the pitch of the wound permanent magnets 4.

A constant rotation speed between threaded spindle 1 and spindle nut 2 and great pitch results in quicker axial travel speeds between threaded spindle 1 and spindle nut 2, whereas a smaller pitch results in a slower travel speed between threaded spindle 1 and spindle nut 2. However, the axial force being transmittable between threaded spindle 1 and spindle nut 2 is then increased as the torque is higher.

Linear motors according to the invention can be used in machine tools, but also in the conveyor technique. Especially suitable are very rapidly rotating linear motor, so that high travel speeds can be realized even when the pitch is small.

Linear motors according to the invention are supported in the axial direction in contactless manner—i.e. free of wear—as a consequence of the effective magnetic fields and form a transmission.

What is claimed is:

1. Linear motor, comprising a secondary part having several permanent magnets disposed behind one another with alternating orientation of the polarity, or excitation windings, whereby the permanent magnets or excitation windings are wound helically around a rotation axis to define a thread turn, and a primary part having a current-carrying winding disposed in parallel relationship to the permanent magnets or excitation windings and arranged about the rotation axis to define a thread turn such that a magnetic traveling field travels helically about the rotation axis, wherein the secondary part engages in the thread turn of the primary part, and wherein the primary part engages in the thread turn of the secondary part, thereby realizing a contactless axial support of the primary part upon the secondary part.

2. Linear motor according to claim 1, wherein the secondary part is stationary and includes a threaded spindle, and the primary cart includes a spindle nut rotatable about the threaded spindle.

3. Linear motor according to claim 2, wherein the spindle nut is rotatably supported by the threaded spindle via a radial bearing selected from the group consisting of rolling-contact bearing and sliding bearing.

4. Linear motor according to claim 1, wherein the primary part includes a rotatable threaded spindle, and the the secondary part is stationary and includes a spindle nut.

5. Linear motor according to claim 4, wherein the spindle nut (2) is supported by the threaded spindle (1) via a radial bearing selected from the group consisting of rolling-contact bearing and sliding bearing.

6. Linear motor according to claim 1, wherein the winding of the primary part includes a plurality of partial windings arranged behind one another.

7. Linear motor according to claim 6, wherein a pitch of the permanent magnets or the excitation coils of the secondary part is equal to a pitch of the partial windings of the primary part.

8. Linear motor according to claim 6, wherein the partial windings disposed behind one another define the thread turn of the primary part.

9. Linear motor according to claim 6, wherein one of the primary and secondary parts includes a threaded spindle, and the other one of the primary and secondary parts includes a spindle nut, wherein the spindle nut has an inner circumference supporting the partial windings, and the spindle has an outer circumference supporting the permanent magnets.

10. Linear motor according to claim 1, wherein the permanent magnets are provided along several turns about the rotation axis, wherein permanent magnets of same orientation of the polarity are arranged flush behind one another in parallel relationship to the rotation axis.

11. A linear motor, comprising:
a primary part; and
a secondary part having an excitation assembly for generating a magnetic field, said excitation assembly being wound helically around a rotation axis to define a thread turn, wherein the primary part has a current-carrying winding disposed in parallel relationship to the excitation assembly and arranged about the rotation axis such that the magnetic field travels helically about the rotation axis, wherein the current-carrying winding defines a thread turn which is in meshing engagement with the thread turn formed by the excitation assembly.

12. The linear motor of claim 11, wherein the excitation assembly includes a plurality of permanent magnets disposed behind one another with alternating orientation of the polarity.

13. The linear motor of claim 12, wherein the permanent magnets are lined along several turns about the rotation axis, with permanent magnets of same orientation of the polarity arranged flush behind one another in parallel relationship to the rotation axis.

14. The linear motor of claim 11, wherein the excitation assembly includes a plurality of excitation windings disposed behind one another with alternating orientation of the polarity.

15. The linear motor of claim 11, wherein the primary part is a stator which includes a threaded spindle, and the secondary part is a rotor which includes a spindle nut supported by the threaded spindle.

16. The linear motor of claim 15, and further comprising a radial bearing selected from the group consisting of rolling-contact bearing and sliding bearing for rotatably supporting the spindle nut upon the threaded spindle.

17. The linear motor of claim 11, wherein the primary part is a rotor which includes a threaded spindle, and the secondary part is a stator which includes a spindle nut supported by the threaded spindle.

18. The linear motor of claim 17, and further comprising a radial bearing selected from the group consisting of rolling-contact bearing and sliding bearing for rotatably supporting the spindle nut upon the threaded spindle.

19. The linear motor of claim 11, wherein the current-carrying winding of the primary part is comprised of a plurality of coils arranged behind one another.

20. The linear motor of claim 19, wherein a pitch of the excitation assembly of the secondary part is equal to a pitch of the coils of the primary part.

21. The linear motor of claim 19, wherein the excitation assembly includes a plurality of permanent magnets disposed behind one another, wherein one of the primary and secondary parts includes a threaded spindle, and the other one of the primary and secondary parts includes a spindle nut, wherein the spindle nut has an inner circumference supporting the coils, and the spindle has an outer circumference supporting the permanent magnet.

* * * * *

UNITED STATES PATENT AND TRADEMARK OFFICE
CERTIFICATE OF CORRECTION

PATENT NO. : 6,822,349 B2  Page 1 of 1
DATED : November 23, 2004
INVENTOR(S) : Erich Lunz and Frank Dürschmied It is certified that error appears in the above-identified patent and that said Letters Patent is hereby corrected as shown below:

Title page,
Item [75], Inventors, replace "Nümberg" with -- Nürnberg --

Column 3,
Line 59, replace "cart" with -- part --;

Column 4,
Line 2, after "is" insert -- rotatably -- and delete "(2)" and "(1)".

Signed and Sealed this

First Day of March, 2005

JON W. DUDAS
*Director of the United States Patent and Trademark Office*